(12) United States Patent
Aisa

(10) Patent No.: US 6,950,010 B2
(45) Date of Patent: Sep. 27, 2005

(54) METHOD, SYSTEM AND APPARATUSES FOR THE TRANSMISSION OF DATA ON ELECTRIC NETWORK

(75) Inventor: Valerio Aisa, Fabriano (IT)

(73) Assignee: WRAP S.p.A., Fabriano (IT)

( * ) Notice: Subject to any disclaimer, the term of this patent is extended or adjusted under 35 U.S.C. 154(b) by 0 days.

(21) Appl. No.: 10/363,757

(22) PCT Filed: Apr. 3, 2001

(86) PCT No.: PCT/IB01/00548

§ 371 (c)(1),
(2), (4) Date: Aug. 4, 2003

(87) PCT Pub. No.: WO02/21664

PCT Pub. Date: Mar. 14, 2002

(65) Prior Publication Data

US 2004/0037221 A1 Feb. 26, 2004

(30) Foreign Application Priority Data

Sep. 5, 2000 (IT) .................................... TO2000A0840

(51) Int. Cl.$^7$ ............................................ H04M 11/04
(52) U.S. Cl. ........................... 340/310.06; 340/310.01; 340/310.02; 340/310.08
(58) Field of Search ...................... 340/310.01–310.08; 375/257–259

(56) References Cited

U.S. PATENT DOCUMENTS

| | | | | |
|---|---|---|---|---|
| 4,418,333 A | * | 11/1983 | Schwarzbach et al. | 340/310.01 |
| 4,742,475 A | * | 5/1988 | Kaiser et al. | 700/278 |
| 5,107,184 A | | 4/1992 | Hu et al. | |
| 5,491,463 A | * | 2/1996 | Sargeant et al. | 340/310.01 |

FOREIGN PATENT DOCUMENTS

| | | |
|---|---|---|
| WO | WO 99/43068 | 8/1999 |
| WO | WO 99/48340 | 9/1999 |
| WO | WO 99/50971 | 10/1999 |

\* cited by examiner

Primary Examiner—Donnie L. Crosland
(74) Attorney, Agent, or Firm—Cesari and McKenna, LLP

(57) ABSTRACT

Method and system for transmitting/receiving or communicating data and information on electric power line between two electronic controlled devices, namely, and electric user (HA), in particular a household appliance, having a first electronic control system and at least a first electric load, and a monitoring or control device (SA), having a second electronic control system, the device (SA) being located on the line between an electric power outlet and the first electric load. The transmission/reception or communication of data and information on the line is obtained by means of electric power modulation between the user (HA) and the device (SA), and/or vice-versa.

37 Claims, 12 Drawing Sheets

FIG. 6b Receiver

FIG. 6a Transmitter

METHOD, SYSTEM AND APPARATUSES FOR THE TRANSMISSION OF DATA ON ELECTRIC NETWORK

DESCRIPTION

The present invention relates to a method, a system and respective means for the transmission or communication of data and/or information on an electric line between two devices having respective electronic control systems.

The need of transmitting data or information using the electric network as a communication means has been known for a long time; this necessity is particularly felt in the so-called home automation or domotic field, where the dialog among different electric users may generate significant benefits in terms of energy saving and improved total performance.

The fact that the same electric network can perform also the role of bi-directional communication line allows for avoiding the need of employing an additional wiring system, and also ensure a full access to all electric users, even if distributed in relatively distant or locations being difficult to access to (such as a garage, an attic, a cellar, etc.). The most common data transmission systems on electric network are based on the use of the so-called power line, which use appropriate modems capable of transmitting and receiving information through specific modulation and demodulation of small electric signals being overlapped on the mains voltage, respectively.

The two modulation techniques most commonly used are known as FSK (Frequency Shift Keying) and ASK (Amplitude Shift Keying), which are based on a particular frequency or amplitude modulation, respectively. Power line transmission systems based on FSK modulation highlight a higher sturdiness to electric noise compared to the systems based on ASK modulation; however, the relevant modems are more expensive. In both cases, anyway, the cost for implementing the communication system in a household electric appliance is usually too high to be directly borne by a household electric user, such as a washing machine, a refrigerator, an iron, an electric stove, and so on.

As a result, the so-called communication node, i.e. the element allowing lie information exchange on the electric network between a household user and other external apparatuses cannot be incorporated inside the household appliance itself due to cost reasons, but should be proposed as an optional device to be managed separately.

However, this involves a higher cost also for the control system of the electric user, for which an electronics having appropriate interfaces for the likely dialog with the communication node is required, as well as an appropriate mechanical housing for the latter within the electric user.

For this reason, the concept of communication on electric network concerns, as a matter of fact, only high-priced electric users, i.e. pertaining to higher model ranges, capable of bearing its unavoidable cost increase, whereas it is substantially precluded to mass production.

From U.S. Pat. No. 5,493,267 an arrangement is disclosed, for the transfer of control commands to a working means in an apparatus, via a wire also used for the power supply to said working means. The arrangement comprises a control unit provided for creating a control command by suppressing, in a predetermined order, at least part of one or several consecutive half-periods of a predetermined polarity of the supply voltage. Moreover, the arrangement comprises a slave unit 11) operating in response to the control command transmitted to activate working means. The control unit has such a design that before a control command is transmitted the control unit operates to shortly disconnect the supply voltage on the wire for a period of time required for the current in the working means to decline essentially to zero.

The present invention has the arm of solving the above drawbacks and, in particular, to provide a method, a system and respective means for the transmission or communication of data or information on electric network, which are alternative and/or complementary to the previous ones and which can be implemented at a low cost on the mass production of household electric users, in particular household appliances.

These and further objects, which will become more apparent in the following, are attained according to the present invention by a method, a system and relevant means for the transmission or communication of data or information on electric network having the features of the annexed claims, which are intended as an integral part of the present description.

The transmission/reception of data on electric network according to the present invention relates in particular to the exchange of binary information between two electric apparatuses, through two modulation and demodulation techniques, which may be complementary between each other.

The data transmission technique on electric line according to the present invention uses, as coding means for the binary information to be transmitted, appropriate controlled interruptions or suspensions of the electric network, called in the following "network interruptions" or "voltage interruptions", obtained through solid state switches, such as triac.

The second data transmission technique on electric line according to the invention uses, as coding means for the binary information, "controlled power absorptions", also obtained through solid state switches (triac).

In both cases the binary information are coded through a particular form of "power modulation", which forms the main core of the present invention; therefore, the two above transmission techniques will be identified in the following as "modulation of the supplied power" and "modulation of the absorbed power", respectively. It is clear that, beside the data coding obtained through power modulation, appropriate demodulation circuits will be provided for decoding the received data.

The two above transmission techniques on electric line can be advantageously employed, according to the present invention, either in a single mode or in a combined mode.

A first advantageous example of use of the present invention, using the combination of the two cited data transmission techniques on electric line, concerns the communication between two electronic controlled apparatuses, represented by a respective electric user, which will be indicated with HA (Home Appliance), and a device for monitoring the operation of the same electric appliance, indicated with SA (Smart Adapter).

A second significant example of use of the present invention concerns a possible aggregation of several electric users HA to one same monitoring device, called MSA (Multiple Smart Adapter), which is appropriately prearranged for the purpose.

Finally, a third example of use of the present invention concerns the specific field of household appliances having a low absorption of electric power (such as refrigerators, freezers, gas hobs, gas boilers, and so on), where even the implementation of the modulation/demodulation of the absorbed power technique only is particularly advantageous, i.e. the technique based on the controlled absorptions of electric power.

Further aims, features and advantages of the present invention will become apparent from the following detailed description made with reference to the annexed drawings, which are only supplied by way of non limiting example, wherein.

As previously mentioned, the object of the present invention, relating to the transmission or exchange of binary information between two electronically controlled apparatuses, can be obtained through two different modulation and demodulation techniques, which will be described separately in the following, with a general reference to the annexed FIG. 1.

Figure 1:
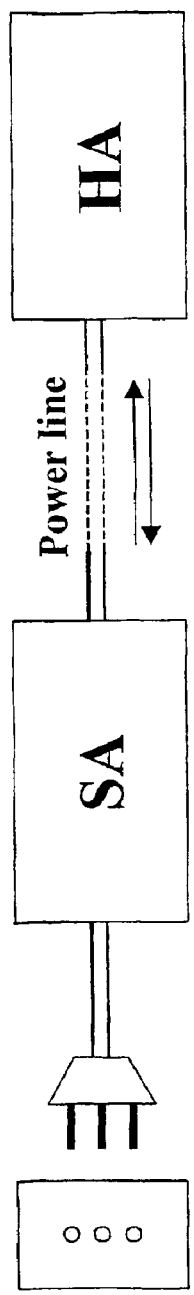
FIG. 1 shows the mode of connection, according to the present invention, between a monitoring device SA (Smart Adapter) and a generic electric user HA (Home Appliance)

Said FIG. 1 describes the way of connection between a monitoring device, indicated with SA (Smart Adapter) and a generic household electric user, indicated with HA (Home Appliance).

The device SA, which is interposed between a current outlet indicated with "Outlet" in FIG. 1 and the electric user HA, is a device performing a monitoring and control function of the electric user itself, it can be assumed, in general terms, that the monitoring device SA is of the type described in U.S. Pat. No. 4,644,320 or EP-A-0 550 263.

Figure 2:
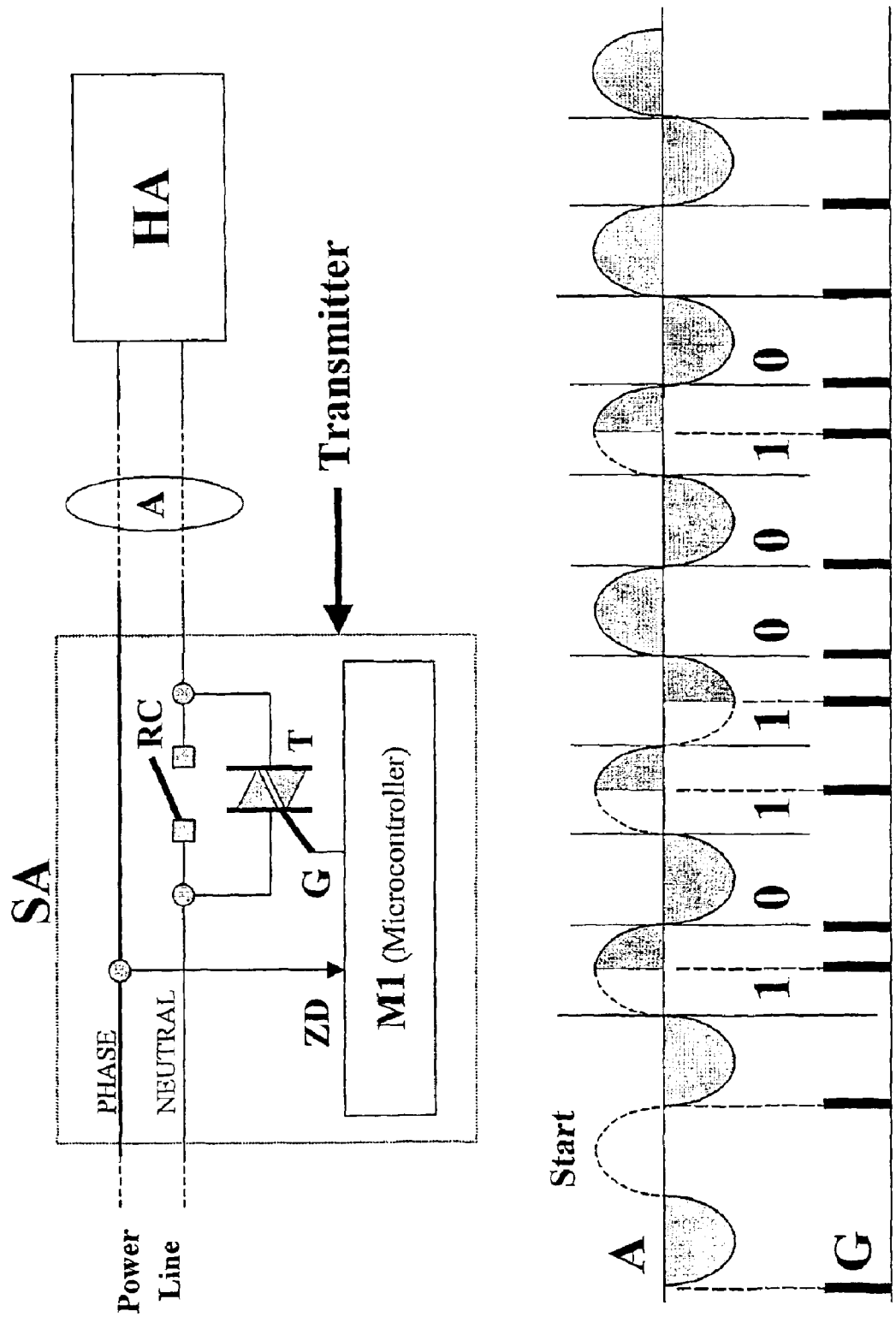
FIG. 2 shows an example of a transmission stage or transmitter of binary information, being comprised in the control system of the monitoring device SA of FIG. 1, using the modulation of the supplied power (power modulation: source mode) to the electric user HA, according to the present invention.
Figure 3A:
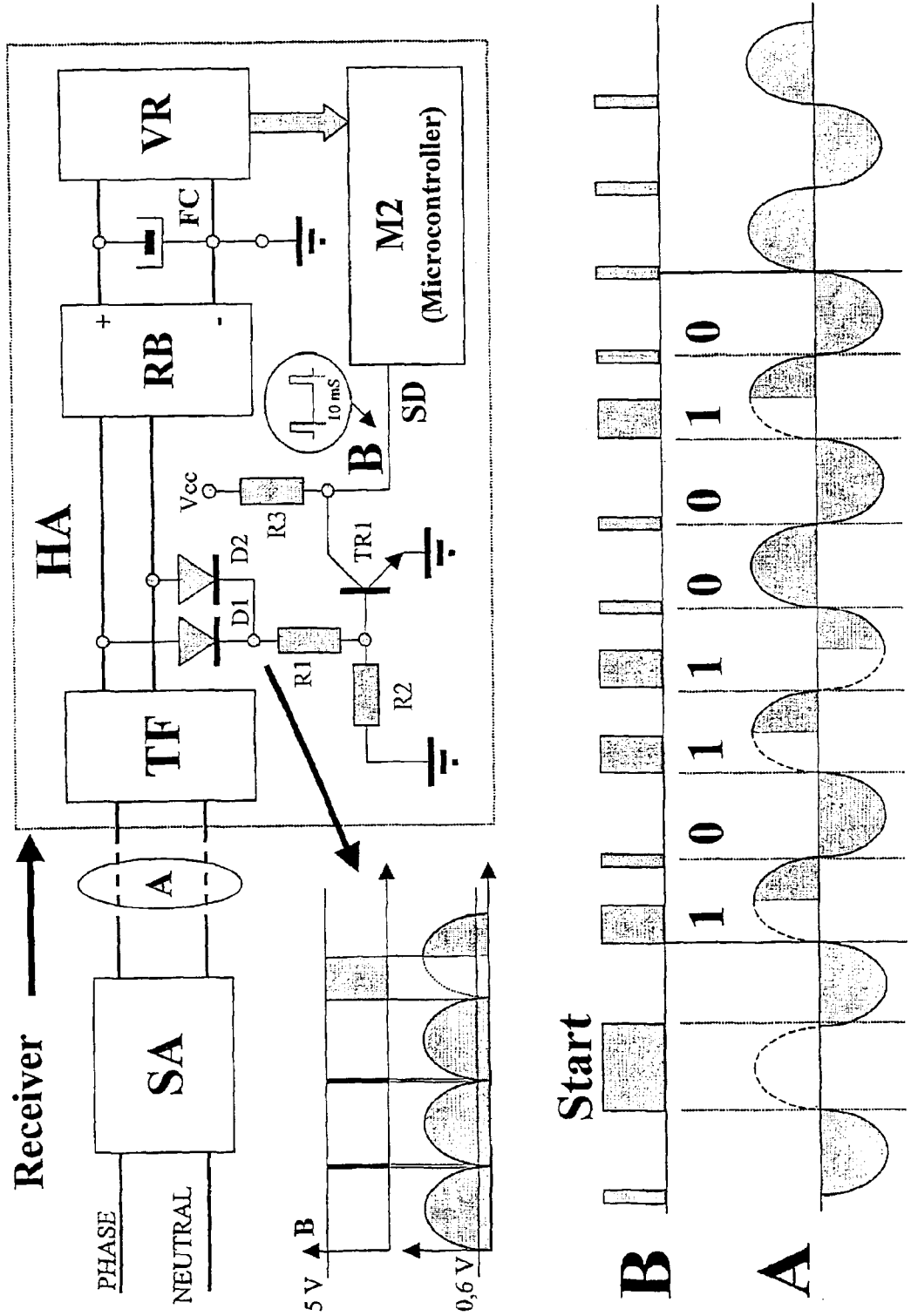
FIG. 3a shows an example of a reception stage or receiver of binary information, being comprised in the control system of the electric user HA of FIG. 1, using the demodulation of the supplied power (power demodulation: source mode) to the user HA through the monitoring device SA, according to the present invention.

1. First Technique of Data Transmission/Reception on Electric Network: Modulation of the Supplied Power A first technique of data transmission/reception on electric network according to the present invention uses, as coding means for the binary information, appropriate controlled lacks or interruptions of the electric mains, which are called hereinafter as network interruptions or voltage interruptions; this technique is featured by the two following essential elements:

a transmitter, capable of generating network interruptions or voltage interruptions in accordance with the binary information to be transmitted; a possible circuit diagram of said transmitter is illustrated in the upper part of FIG. 2;

a receiver, capable of detecting and decoding said network interruptions; a possible circuit diagram of said receiver is illustrated in the upper part of FIG. 3a. Possible variant embodiments of this receiver are illustrated in the upper part of FIGS. 3b, 3c and 3d.

The technique of data transmission/receiving on electric network based on the modulation/demodulation of the supplied power according to a basic implementation of the present invention provides for the association of one bit to each half-wave of the mains voltage; conveniently, a fixed time, such as 5 mSec may be assigned to every network interruption (relating to each half wave), or another more appropriate value also in view of the application in use. Therefore, considering that the mains frequency is 50 or 60 Hz (Europe/USA, Japan), the data baud rate equals 100 or 120 bps (bits per seconds), respectively.

1.1 Description of the transmitter for the network interruptions technique

The description of the transmitter for the network interruptions according to the present invention relates to FIG. 2.

According to the basic version of the present invention, the transmitter associated to the control system of the monitoring device SA generates network interruptions, being of controlled duration within a predetermined time interval, by means of a solid state switch or relay, being represented by the triac T in FIG. 2, whose actuating signal G (applied to the gate of the triac T) is appropriately synchronized with a signal ZD which detects the zero-crossing of the mains voltage.

The triac T is arranged in parallel to the normally closed contact RC of an appropriate electromechanical relay, capable of managing the current flow to the electric user HA when there is no need for data transmission, i.e. no needs of generating network interruptions. Moreover, the triac T has the further purpose of protecting the same contact RC, by intervening every time before it switches, to avoid sparking (photo-voltaic arc) and its consequent wear. This is obtained by switching the contact RC of the relay always with the triac T being closed (enabled), according to a procedure known to the man skilled in the art, which can be summarized in the sequence of the following three operations:

1. closure of the triac T;
2. energization (or de-energization) of the coil of the relay RC;
3. opening of the triac T after the contact of the relay RC has terminated its switching operation, reaching a stability state (no contact bouncing).

The relay RC, the triac T and the synchronism signal ZD are managed by a microcontroller indicated with M1 in FIG. 2.

As to the coding logic of the binary data to be transmitted, two possible procedures are provided according to the basic version of the present invention:

positive logic coding: a logic "1" corresponds to the presence of a network interruption and a logic "0" corresponds to the absence of the same in the period of time being provided for the data transmission;

negative logic coding: a logic "0" corresponds to the presence of a network interruption and a logic "1" corresponds to the absence of the same in the period of time being provided for the data transmission.

The graph chart illustrated in the lower part of FIG. 2 highlights by mere way of non limiting example the transmission of a sequence of 8 bit, using a positive logic coding, wherein the duration of the network interruptions associated to the logic "1s" equals a fourth of the mains period (5 mSec, should the mains frequency be 50 Hz).

This bits sequence is preceded by a transmission start signal indicated by "Start" which, by way of non limiting example, is represented by a network interruption lasting a mains half cycle (10 mSec, should the mains frequency be 50 Hz).

The upper part of the graph chart in FIG. 2 indicates a temporary sequence of the alternated half-waves of the mains voltage (voltage A applied to the user HA by the device SA—see upper part of FIG. 2), whereas the lower part of the graph chart of FIG. 2 indicates the pulses of the signal G applied by the microcontroller M1 to the gate of the triac T, according to the logic level of each bit to be transmitted.

Figure 6:
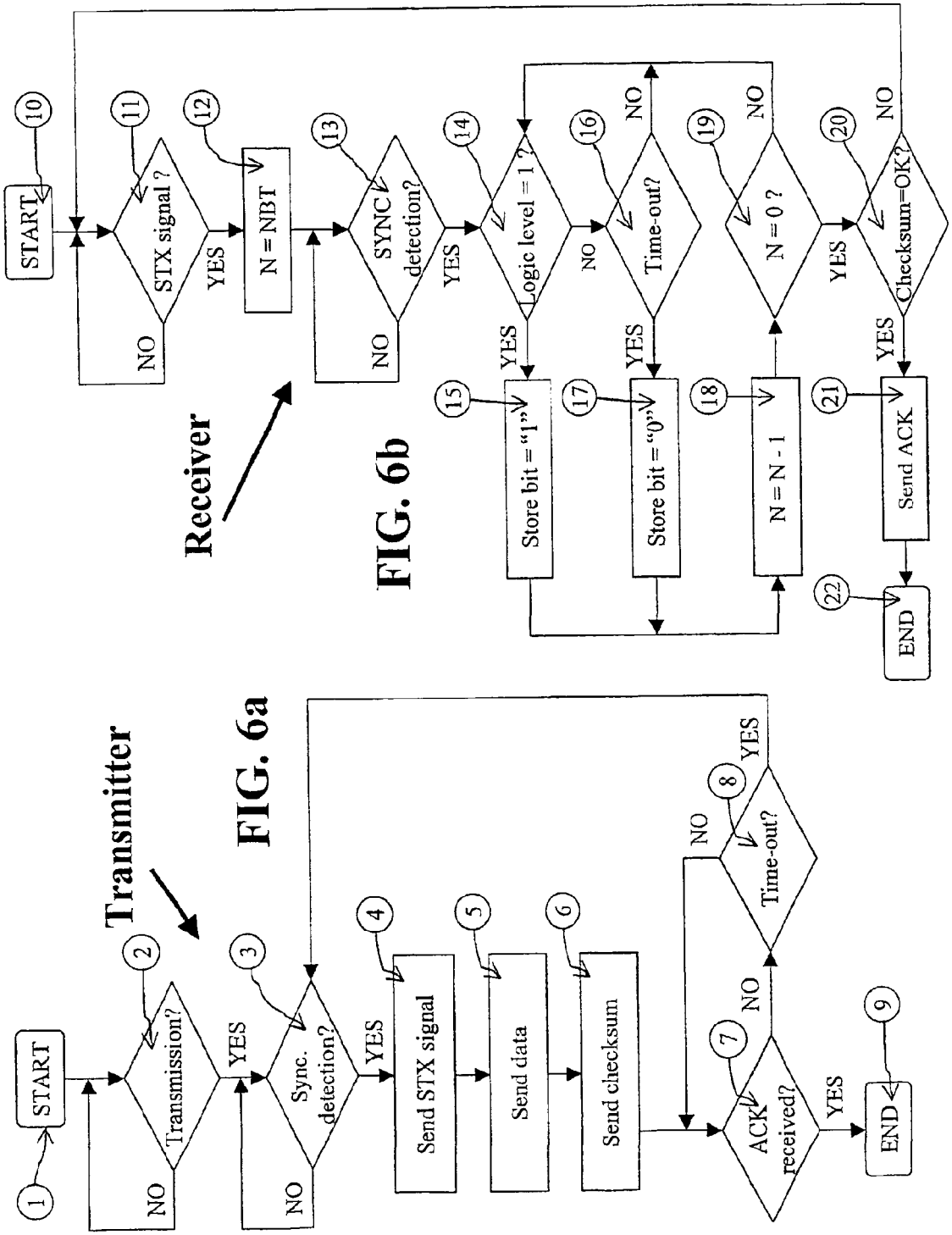
FIG. 6a shows a flowchart describing a generic transmission of digital information using the power modulation technique according to the present invention; this flowchart can be associated to both the transmission techniques (FIGS. 2 and 4) which are the object of the present invention.
FIG. 6b shows a flowchart associated to the receiving stage of digital information using the power modulation technique according to the present invention; this flowchart can be associated to both reception techniques (FIGS. 3 and 5), which are the object of the present invention.

FIG. 6a represents, by way of non limiting example, a flowchart indicating a possible communication protocol to be adopted for transmitting digital information on electric network according to the embodiment of the present invention illustrated in FIG. 2.

Block 1 of this flowchart is a start block; block 2 is a test block, wherein the control program checks the likely start condition of the transmission. If the start condition of the transmission is not verified, the control remains at block 2, otherwise it passes to block 3.

Block 3 is a test block, wherein the control program searches the synchronism condition with the zero-crossing of the mains voltage. If the synchronism condition is not verified, the control remains at block 3, otherwise it goes on to block 4, where the transmission starts.

Blocks 4, 5 and 6 represent schematically, by way of non limiting example, the following three phases of the transmission of binary data:

1. sending of the signal (STX) of start of transmission, i.e. the signal indicated with "Start" in FIG. 2;
2. sending of a fixed sequence of bits which is associated to the digital information to be transmitted;
3. sending of the checksum control signal relating to the transmitted sequence of bits.

Once the checksum has been sent, the control goes over to block 7, which is a test block in which an acknowledge signal ACK is waited of the correct reception by the control system of the receiving electric user HA of FIG. 2.

If there is no ACK signal, the control goes over to block 8, which is a test block checking the achievement of a determined time-out, within which the signal ACK by the receiving device HA should arrive.

If the signal ACK does not arrive within the maximum pre-set time-out, the control goes back to block 3 for a complete repeat of the transmission, whereas, if the above signal of correct reception arrives within the pre-set time-out, the control is released to block 9, which is a block of transmission end.

1.2 Description of the Receiver for the Network Interruptions Technique

Figure 3B:
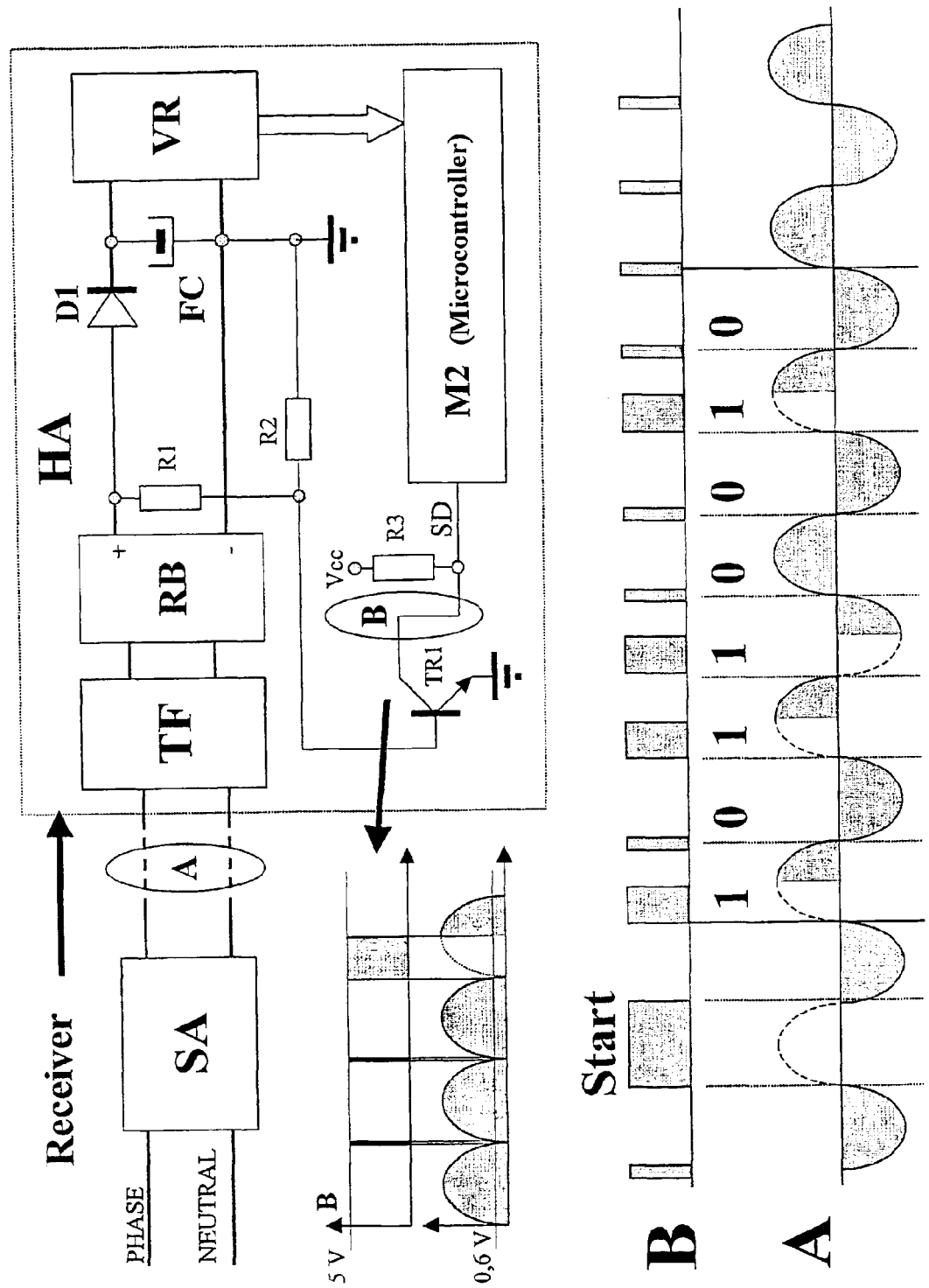
FIGS. 3b, 3c and 3d illustrate three further possible embodiments of a receiving stage of binary information being comprised in the control system of the electric user HA of FIG. 1, each one using the demodulation of the supplied power (power demodulation: source mode) to such a user through the monitoring device SA, according to the present invention.
Figure 3C:
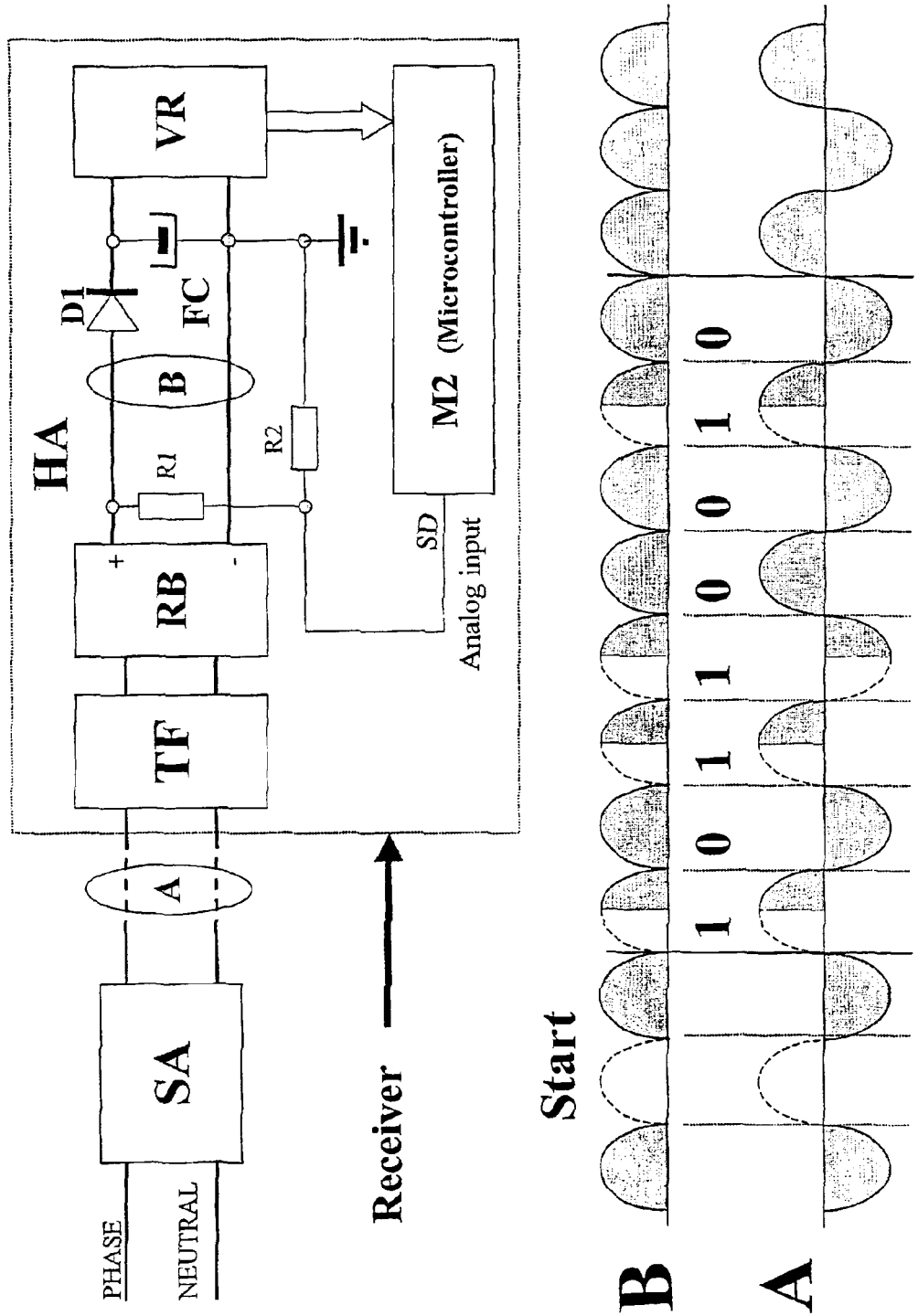

The description of the receiver of network interruptions according to the present invention refers to FIGS. 3a, 3b and 3c, wherein three possible circuit embodiments are illustrated by way of non limiting example, respectively.

A first circuit embodiment of the receiver of network interruptions according to the basic version of the present invention is represented in FIG. 3a, where TF (Transformer) indicates a standard transformer contained in the control card of the electric user HA; RB (Rectifier Bridge) indicates a diodes bridge used for rectifying the output voltage from the secondary of the transformer TF; FC (Filtering Capacitor) indicates a filter capacitor; VR (Voltage Regulator) indicates a voltage regulator and M2 indicates a microcontroller managing the control system of the electric user HA.

The receiver shown in FIG. 3a, being associated to the control system of the electric user HA, decodes the network interruptions produced by the transmitter of FIG. 2 by means of two diodes D1 and D2, whose anodes are located at the terminals of the secondary of the transformer TF.

The output half waves of the secondary of the transformer TF, rectified by the diodes D1 and D2, are applied to the base of a transistor TR1 through a resistive divider consisting of the resistors R1 and R2, generating a positive pulse when the transistor TR1 is locked (0,6 Volt applied to the lower base).

As a result, upon absence of network interruptions, the signal B in correspondence with the collector of the transistor TR1, applied to the input SD of the microcontroller M2, is normally low, save around the zero crossing, where a positive pulse is generated as indicated in the graphic representation of detail on the left side of FIG. 3a, of the output signal from the common cathodes of the diodes D1 and D2 amplified by the transistor TR1. For simplicity's sake, in this representation of detail, it has been considered the value of the resistor R2 as being much higher than the one of the resistor R1; therefore, the transistor TR1 is deemed to be locked when the voltage on the cathodes of the diodes D1 and D2 is lower than 0,6 Volt.

More in general, since the amplitude of the above zero-crossing pulse depends upon the divider R1–R2, the latter will be chosen accordingly for the application, however, without any limits to the generality of the present invention.

On the contrary, in the presence of a network interruption, the signal B on the collector of the transistor TR1 takes a high value, equal to Vcc (output voltage regulated at the voltage regulator VR) due to the presence of a pull-up resistor, indicated with R3. The result is the trend of the signal B (highlighted in the upper part of the graph chart in FIG. 3a), expressed as a function of the signal A (highlighted in the lower part of the same graph chart) and applied to the electric user HA through the monitoring device SA.

As it can be easily noticed, the information ("Start", logic value "one", logic value "zero") is contained within the duration of the signal B which is generated in correspondence with the transistor TR1.

A second possible circuit embodiment for the receiver of network interruptions according to the present invention is represented in FIG. 3b, where TF is the transformer of the control card of the electric user HA, RB is the diodes bridge employed for rectifying the output voltage from the secondary of the transformer TF, D1 is the diode used for uncoupling the output of the secondary of the transformer TF, FC is the filter capacitor, VR is the voltage regulator and M2 is the microcontroller managing the control system of the user HA.

Compared to the previous circuit embodiment, the half waves exiting the transformer TF are rectified by the diodes bridge RB, instead of the two diodes D1 and D2 of FIG. 3a. The signal is supplied to the base of the transistor TR1 always through the resistive divider R1–R2.

As it can be noticed in the graphic representation of detail on the left side of FIG. 3b, the signal B taken from the collector of the transistor TR1 has a trend substantially matching the one already described with reference to FIG. 3a.

Also, the graph chart in the lower part of FIG. 3b highlights the trend of the signal B as a function of the signal A, which is analogous to the one shown in FIG. 3A, as it can be seen. In both solutions (FIG. 3a and FIG. 3b), the signal applied to the input SD of the microcontroller M2 is a digital signal and the various types of information brought by the decoded signal are distinguished based on the duration of the pulse being produced.

With reference to the duration of the above pulse, three different types of information can be distinguished:
1. a short zero-crossing pulse, whose duration depends substantially on the value of the resistive divider R1–R2, which in the figure corresponds to a logic "zero" being sent (assuming the choice of a positive logic);
2. a pulse, whose duration is equal to the network interruption, which in the figure corresponds to a fourth of the mains cycle, corresponding to a logic "one" being sent (assuming the choice of a positive logic);
3. a start pulse, indicated with "Start", whose duration is equal to a mains half cycle.

A third possible circuit embodiment of the receiver of network interruptions according to the present invention is represented in FIG. 3c, where TF is the transformer of the control card of the electric user HA, RB is the diodes bridge employed for rectifying the output voltage from the secondary of the transformer TF, D1 is the diode used for uncoupling the output of the secondary of the transformer TF, FC is the filter capacitor, VR is the voltage regulator and M2 is the microcontroller managing the control system of the user HA.

The only difference compared to the circuit embodiment of FIG. 3b is that the signal applied to the input SD of the microcontroller M2 is an analogic signal instead of a digital signal. This signal, whose amplitude is appropriately adapted to the input SD through the resistive divider R1–R2, is decoded with the aid of an appropriate analogic-digital converter being present within the microcontroller M2.

The upper part of the graph chart shown in FIG. 3c represents the trend of the signal B expressed in function of the signal A, being highlighted in the bottom part of the same graph chart, applied to the electric user HA through the monitoring device SA.

As it can be noticed, all the three circuit embodiment examples of the receiver of network interruptions described above, have a minimum electronic cost, matching in fact to that of a standard zero-crossing detecting circuit. However, considering that such a circuit is anyway required for the normal operation of the control system of the electric user HA, it is clear how the detection of the network interruptions according to the present invention practically occurs at zero cost.

FIG. 6b represents by way of non limiting example a flowchart reporting a possible communication protocol to be adopted for receiving digital information on electric network, transmitted through the technique of network interruptions, according to the embodiments of the present invention illustrated in the FIGS. 3a, 3b and 3c.

Block 10 in this flowchart is a start block; block 11 is a test block, wherein the control program checks the likely arrival of the signal STX previously indicated with "Start", which indicates the transmission start by the control system of the monitoring device SA. If the transmission start condition is not verified, then the control remains at the block 11; otherwise, it is passes to block 12.

Block 12 is an initialization block of a counter N, wherein the number NBT of the bits provided in the transmission is stored.

The block 12 then releases the control to the block 13, which is a test block wherein the control program researches the synchronism condition associated to the zero-crossing.

If the synchronism condition is not verified, the control remains at the block 13; otherwise it goes on to the block 14, where the real reception process starts.

Block 14 is a test block, wherein the logic level of the received bit is verified. If the logic level corresponds to "1", this value is stored in the corresponding register of the received bits; otherwise, if there is no pulse which can be associated to the logic "1" within the mains half cycle (block 16, wherein the "time-out" variable is worth 10 mSec when the mains frequency is 50 Hz), a "0" is stored (block 17).

Subsequently, the control goes on to block 18, where the value inside the register N is decreased by one unit.

Then the block 19 follows, which is a test block, wherein the register contents N is checked. If N is higher than zero, the control goes back to block 14 for acquiring the subsequent bit, whereas if N is equal to 0, the control goes to block 20, which is a test block checking the bits quality through the known checksum control technique.

Should the checksum verification have a negative result, the control goes back to block 11, where the whole transmission is repeated by the monitoring device SA; if this verification, vice-versa, is satisfactory, the control goes on to the block 21, which sends the acknowledge signal ACK of correct reception of digital information transmitted by the monitoring device SA.

Then the block 21 releases control to the block 22 of reception end.

1.3 Generalization of the Data Transmission Technique on Electric Network Based on Modulation/Demodulation of the Supplied Power A more general implementation of the data transmission technique on electric network described above with modulation/demodulation of the supplied power may provide, according to the present invention, for the association of several bits to every mains voltage half wave. This may be obtained, for example, by imposing a variable duration to each network interruption, expressed as a multiple of a basic duration D0 (e.g. D0=0,1 mSec), corresponding to the weight of the lightest bit (bit0=$2^0$*D0→0,1 mSec; bit1=$2^1$*D0→0,2 mSec; bit2=$2^2$*D0→0,4 mSec; bit3=$2^3$*D0→0,8 mSec).

In this case, the transmission speed may sensibly increase compared to the previous basic example (association of one bit to each half wave, with fixed duration of the network interruptions), depending on the modulation mode being adopted.

Assuming, for simplicity's sake, the use of a positive logic, the coding and the decoding of the binary data being transmitted or received, respectively, may be performed, according to the present invention in its more general version, adopting the following procedure. This coding/decoding procedure, indicated by way of non limiting example, associates a "nibble", i.e. a 4-bits binary configuration, to each mains voltage half wave; some coding/decoding examples according to the above procedure are as follows:

nibble="0000": transmission/reception of the decimal number "zero" associated to the total absence of a network interruption;
nibble="0001": transmission/reception of the decimal number "one" associated to the presence of a network interruption having a duration equal to 0,1 mSec;
nibble="0011": transmission/reception of the decimal number "three" associated to the presence of a network interruption having a duration equal to 0,3 mSec;
nibble="0110": transmission/reception of the decimal number "ten" associated to the presence of a network interruption having a duration equal to 1 mSec;
nibble="1111": transmission/reception of the decimal number "fifteen" associated to the presence of a network interruption having a duration equal to 1,5 mSec.

Therefore, the ensuing transmission speed is equal to 400 or 480 bps, with reference to a mains frequency of 50 or 60 Hz, respectively.

1.4 Case of Electric User Having a Control System Supplied Without a Voltage Transformer In the particular event of an electric user HA fitted with an electronic control system supplied directly from the mains through an appropriate impedance (such as of the type RC series) instead of a transformer, the transmission and reception procedure described above has to be restricted to one half wave alone: i.e. the one supplying the electronic control system through the drop impedance of the mains voltage. In such an event, obviously, the quantity of information to be sent in one second (baud-rate) is halved, but the transmission logic remains always the same, being fully included as a particular case in the teachings of the present invention.

Figure 3D:
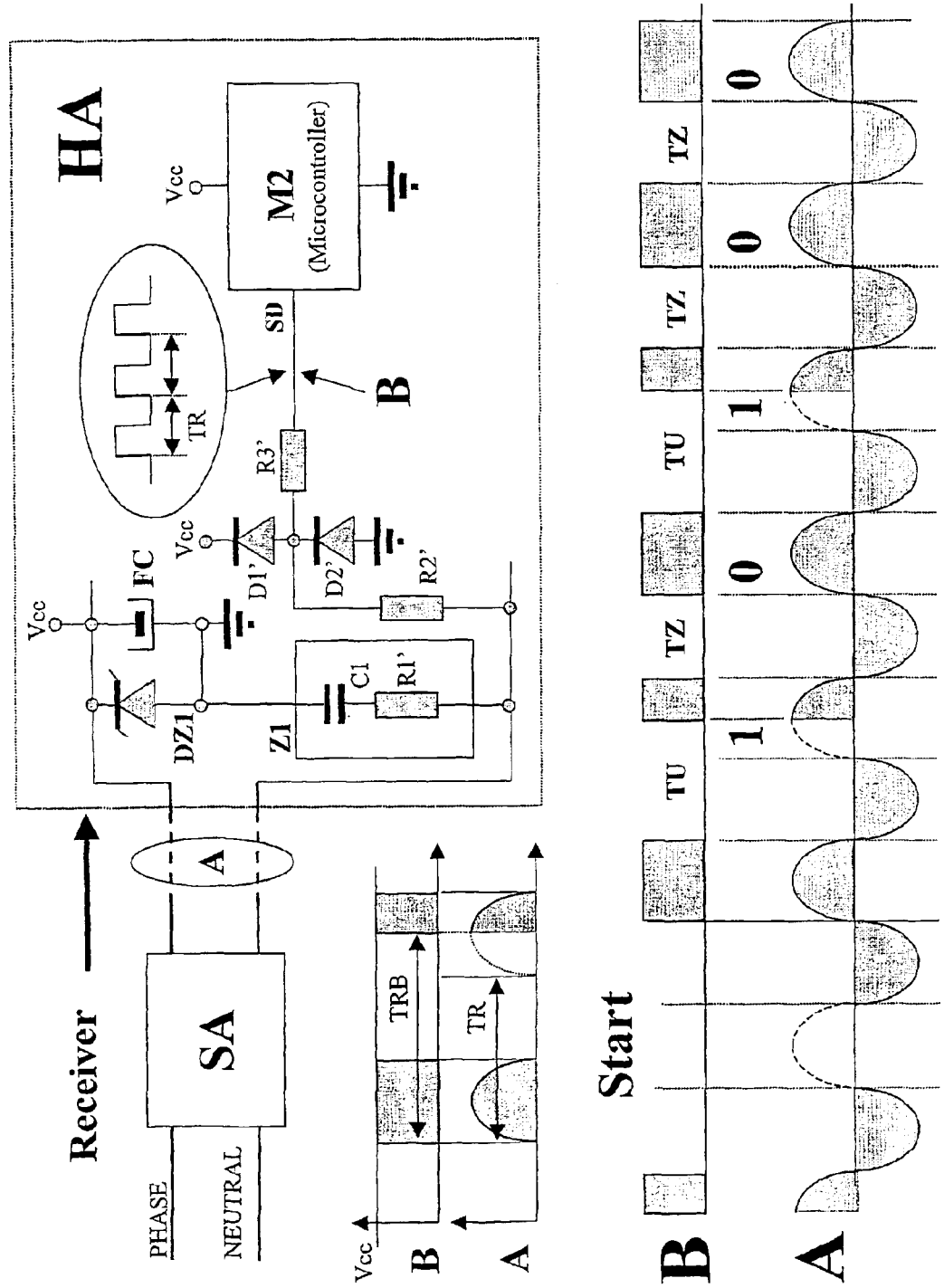

An example of a receiver of network interruptions like the one mentioned just above, associated to an electric user HA fitted with an electronic control system supplied directly by the mains voltage through a capacitive impedance is represented in FIG. 3d.

In this figure, DZ1 indicates a zener diode stabilizing the supply voltage Vcc, FC is the filter capacitor, Z1 is the drop impedance (constituted by the connection in series of a capacitor C1 and a resistor R1') supplying the system directly from the mains voltage; M2 is the microcontroller of the control system of HA, R2' is the resistor (with a high value: typically 1 megaohm) through which the zero-crossing signal is picked up; D1', D2' and R3' indicate the two diodes and the resistor protecting the input SD of the microcontroller M2 against possible transitory over voltages, respectively.

The synchronism signal picked up through the resistor R2' and presented, through R3', at the input SD of the microcontroller M2 typically consists, in the absence of network interruptions, of a square wave with 50% duty-cycle and with cycle TR equal to the cycle associated to the mains frequency (e.g.: TR=10 mSec, should the network frequency be 50 Hz). In the presence of a network interruption, on the contrary, the temporary interval TRB between two subsequent positive edges will be higher compared to the mains cycle TR, as shown in the graphic representation of detail on the left side of FIG. 3d.

In this instance, the useful information is associated to the half wave alone supplying the control system of HA and is contained, for example, in the time interval separating a negative edge of the signal B from its subsequent positive edge, so that the interval TU associated to a logic "one" is well separated from the interval TZ associated to a logic "zero", as graphically represented in the bottom part of FIG. 3d.

It is clear that other circuit solutions, as well as other possible interpretation procedures of the coded information, are possible for the man skilled in the art to the receiver of network interruptions without departing from the novelty spirit of the invention.

Finally, it is also clear that a simplified receiver as described above may be advantageously applied by virtue of its minimum cost, also should the electronic control system of the electric user HA be fitted with a transformer, but not require a galvanic insulation between its logic mass and the network voltage.

Figure 4:
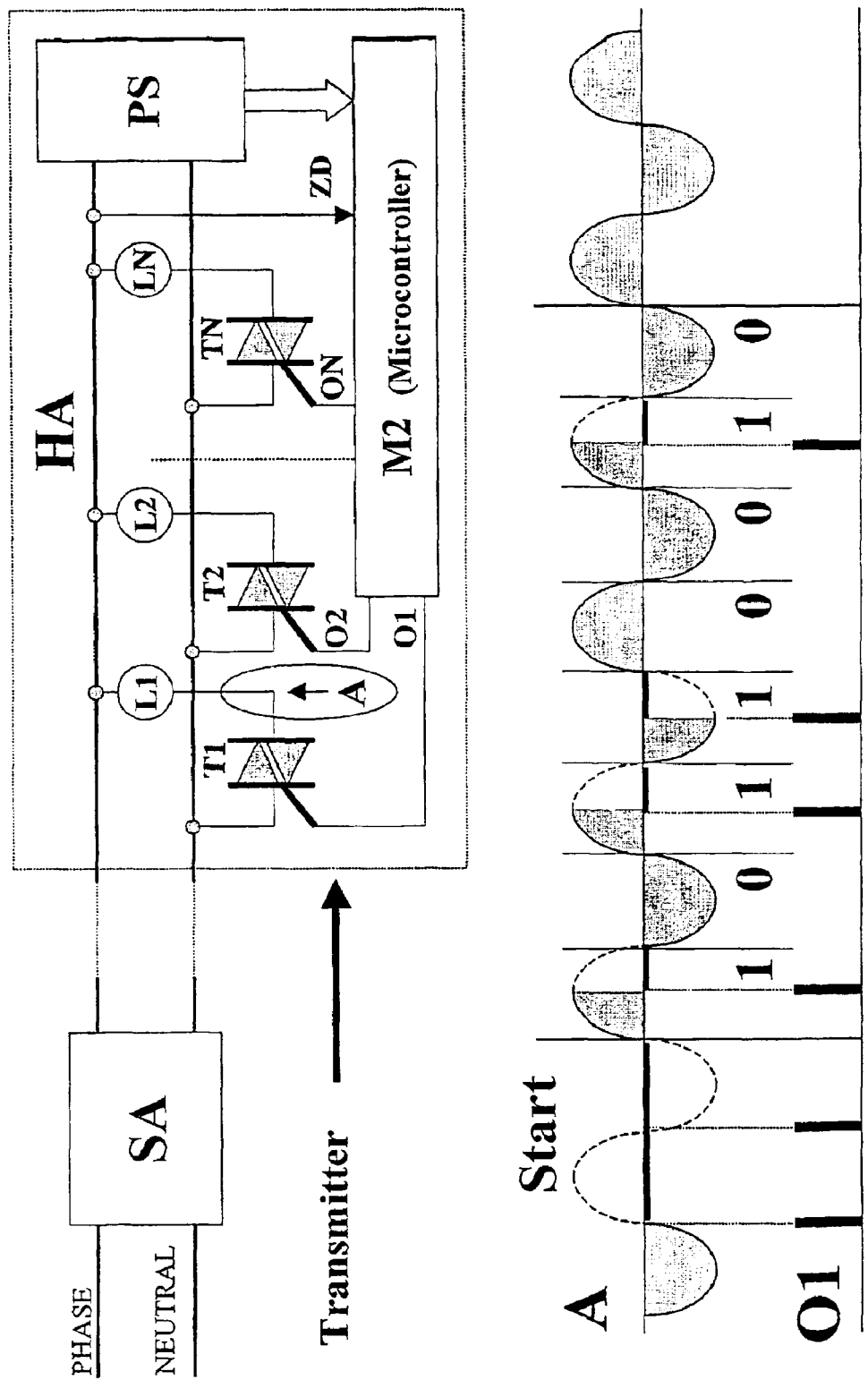
FIG. 4 shows an example of a transmission stage or transmitter of binary information being comprised in the control system of the electric user HA of FIG. 1, using the modulation of the absorbed power (power modulation: sink mode) from the same user, according to the present invention.
Figure 5:
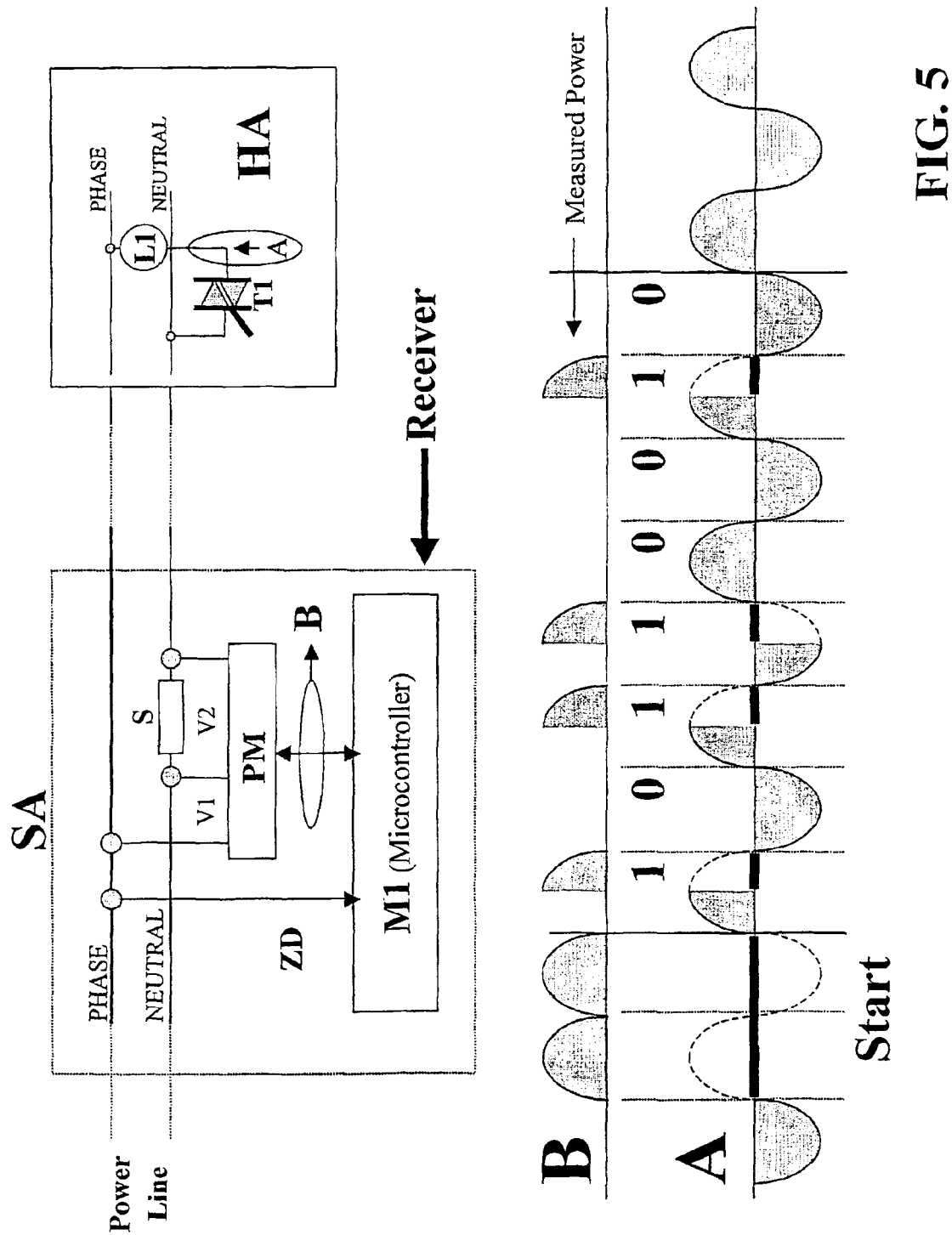
FIG. 5 shows an example of a receiving stage or receiver of binary information being comprised in the control system of the monitoring device SA of FIG. 1, using the demodulation of the absorbed power (power demodulation: sink mode) from of the electric user HA according to the present invention.

2. Second Technique of Data Transmission/reception on Electric Network: Modulation of the Absorbed Power The second technique of data transmission on electric network according to the present invention uses, as coding means of binary information, controlled absorptions of electric power, and is featured by the two following essential elements:

a transmitter, capable of performing controlled absorptions of electric power in accordance with the binary information to be transmitted; a possible circuit diagram of this transmitter is illustrated in the upper part of FIG. 4;

a receiver, capable of detecting and decoding said absorptions of electric power; a possible circuit diagram of this receiver is illustrated in the upper part of FIG. 5.

The technique for transmitting data on electric network based on modulation/demodulation of the absorbed power, according to a basic implementation of the present invention, provides for the association of one bit to each half wave of the mains voltage, to each power absorption being imposed a value which is higher than a predetermined threshold SS (e.g, SS=3 W).

In this instance, considering a mains frequency of 50 or 60 Hz, the data baud-rate equals 100 or 120 bps (bits per second), respectively.

2.1 Description of the Transmitter of Controlled Absorption of Electric Power

The description of the transmitter of controlled absorption of electric power according to the invention refers to FIG. 4.

According to the basic version of the present invention, the transmitter comprised in the control system of the electric user HA is programmed for generating controlled absorptions of electric power with the use of a solid state switch or relay, represented by the triac indicated with T1 in FIG. 4, whose activation signal O1 (applied to the gate) is managed by the microcontroller M2, supplied by means of a voltage regulator PS (Power Supply), and appropriately synchronized with the signal ZD detecting the zero-crossing.

The triac T1 is associated to a generic electric load indicated with L1, appropriately chosen between the ones being available on the electric user HA.

In the very particular event where the electric user HA should not have any load being controlled through a triac (such as when all loads are managed by electromechanical relays), according to the present invention a low cost solution will be employed, which consists of a small triac (such as a 0,8 A device in a plastic container TO92) with associated a low resistive electric load (e.g. 10 W).

As to the coding logic of the binary data to be transmitted, according to the basic version of the present invention, the following two possible procedures are provided:

positive logic coding: a logic "1" corresponds to the presence of an electric power absorption being higher than a predetermined threshold SS (e.g. SS=3 W) and a logic "0" corresponds to the absence of power absorption;

negative logic coding: a logic "0" corresponds to the presence of an electric power absorption being higher than a predetermined threshold SS (e.g. SS=3 W) and a logic "1" corresponds to the absence of power absorption.

The graph chart shown in the lower part of FIG. 4 represents by way of non limiting example the transmission of a sequence of 8 bits using a positive logic coding, wherein the power absorptions, associated to the logic "1", equal half the instantaneous power associated to the load L1 and relate to a fourth of the mains cycle (5 mSec, should the network frequency be 50 Hz).

This sequence of bits is preceded by a "Start" signal which, by way of non limiting example, is represented by an absorption equaling the full power of the load L1, associated to a mains cycle (20 mSec, should the network frequency be 50 Hz). The upper part of the graph chart shows the voltage A at the terminals of the triac T1, whereas the bottom part of the graph chart shows the pulses O1 applied by the microcontroller M2 to the gate of the same triac T1, in accordance with the logic level of each bit to be transmitted.

One of the possible communication protocols to be adopted for transmitting digital information on electric line according to the above technique, based on controlled absorptions of electric power is illustrated in the flowchart of FIG. 6a; therefore, as it can be noticed, this protocol can perfectly match the one associated to the transmitter of network interruptions previously described (par. 1.1—Description of the transmitter of network interruptions).

2.2 Description of the Receiver of Controlled Absorptions of Electric Power

The description of the receiver of controlled absorptions of electric power according to the present invention relates to FIG. 5, where PM (Power Meter) indicates a common power meter, S (Shunt) indicates a current resistive detector and M1 indicates the above microcontroller fitting the monitoring device SA.

The microcontroller M1, which manages the receiver in the monitoring device SA according to the basic version of the present invention, detects the presence of electric power absorptions by the user HA and determines their entity through the continuous metering of the power supplied in correspondence with each half wave of the mains voltage, through the device PM.

The decoding of the controlled absorptions of electric power according to the present invention, represented by way of non limiting example in the graph chart reported in the bottom part of FIG. 5, uses a positive logic (i.e. a logic "1" is associated to each power absorption related to a half wave).

The bottom part of the graph chart represents the trend of the mains voltage A measured at the terminals of the triac T1 employed for the communication from the electric user HA, whereas the upper part of the graph chart represents the power B measured by the device PM.

The current detector S represented in FIG. 5, by way of non limiting example, is a precision resistor with a low thermal coefficient (e.g. S=5 m$\Omega$ 1%), whose voltage at the terminals (V2) is proportional to the current crossing it, according to the known Ohm law.

More generally, according to the present invention, said detector S may be represented by any other current detector (such as a current transformer, a Hall-effect sensor, and so on).

A possible communication protocol to be adopted for receiving information on electric network according to the above technique based on controlled absorptions of electric power is illustrated in the flowchart of FIG. 6b; therefore, as it can be noticed, this protocol can perfectly match the one associated to the receiver of network interruptions previously described (see par. "Description of the receiver of network interruptions).

Finally, as to the decoding logic of the received binary data, according to the basic version of the present invention, the two procedures described above with reference to the transmitter apply (see par. 2.1 Description of the transmitter of controlled absolutions of electric power).

2.3 Generalization of the Data Transmission Technique on Electric Network Based on Modulation/Demodulation of the Absorbed Power A more general implementation of the data transmission technique on electric network based on modulation/demodulation of the absorbed power described above according to the present invention may provide for the association of several bits to each half wave of the mains voltage. This may be obtained for example by imposing a value of variable entity to each controlled absorption of electric power, being expressed as a multiple of a basic absorption P0 (e.g. P0=1 Watt) corresponding to the weight of the lightest bit (bit0=$2^0$ *P0$\rightarrow$1 W; bit1=$2^1$ *P0$\rightarrow$2 W; bit2=$2^2$ *P0$\rightarrow$4 W; bit3=$2^3$ *P0$\rightarrow$8 W).

In this case, the transmission speed may sensibly increase compared to the previous basic example (association of one bit to each half wave); assuming the use of a positive logic, for simplicity's sake, according to a more general version of the present invention, coding and/or decoding of binary data transmitted or received, respectively, may be performed through the procedure described here below.

This coding/decoding procedure, indicated by way of non limiting example, associates a nibble, i.e. a binary configuration of 4 bits, to each half wave of the mains voltage; the following are a few coding/decoding examples according to the above procedure:

nibble="0000": transmission/reception of the decimal number "zero" associated to the absence of power absorption;

nibble="0001": transmission/reception of the decimal number "one" associated to a power absorption equal to 1 Watt;

nibble="0011": transmission/reception of the decimal number "three" associated to a power, absorption equal to 3 Watt;

nibble="0110": transmission/reception of the decimal number "ten" associated to a power absorption equal to 10 Watt;

nibble="1111": transmission/reception of the decimal number "fifteen" associated to a power absorption equal to 15 Watt.

The ensuing transmission speed equals 400 or 480 bps, as for the case described under par. 1.3, with reference to a network frequency of 50 or 60 Hz, respectively.

3. Examples of Use of the Poker Modulation Techniques According to the Invention As previously mentioned, considering that both the data transmission techniques on electric network described above concern modulation of the supplied power or absorbed power, this type of modulation is herein called power modulation.

The above data transmission techniques on electric network may be advantageously used, according to the present invention, both in an individual mode and in a combined mode; moreover, the present invention may be applied according to its basic version or to its more general version.

A particularly advantageous application employing a combination of the two transmission techniques based on power modulation is described in the following by way of non limiting example, according to the basic version of the present invention (i.e. featured by transmission/reception of one bit for each half wave of the mains voltage).

This application concerns the communication between two electronically controlled apparatuses, represented by an electric user HA and a monitoring device SA of the operation of the electric user, respectively, as already mentioned with reference to FIG. 1.

A second possible use of the present invention, particularly advantageous, obtained as a generalization of the previous one is then described, and finally a third possible application based on the use of the transmission technique with controlled absorptions of electric power only is finally described.

3.1 First Example of Use of the Power Modulation Techniques

As previously mentioned, FIG. 1 describes the mode of connection between a monitoring device SA and a household electric user HA.

The device SA is interposed between the current outlet and the electric user HA and performs a monitoring and control function of said electric user (as said above, the device SA may use the teachings described in U.S. Pat. No. 4,644,320 or EP-A-0 550 263).

According to the application of the invention described herein, the basic functions performed by the monitoring device SA are one or more of the following ones:

a) metering of the electric current absorbed instant by instant by the electric user HA;

b) metering of the mains voltage applied to the electric user HA;

c) metering of the power factor (cos φ) of the electric load represented by HA;

d) metering of the power absorbed instant by instant by the electric user HA;

e) metering, and storing in a suitable non volatile memory, of the electric energy consumed by the electric user HA;

f) metering, and storing in a suitable non volatile memory, of the over voltages and brownouts of the mains voltage during a certain time interval;

g) remote control of the electric user HA by means of a relay;

h) generation, and storing in a suitable non volatile memory, of information relating to the operating status of the electric user HA;

i) generation, and storing in a suitable non volatile memory, of statistical data related to the operation of the electric user HA and mode of use by the person operating the electric user;

j) generation, and storing in a suitable non volatile memory, of diagnostic information related to the operation of the electric user HA, which are based on the trends of the electric quantities metered by SA;

k) dialog capacity with the external environment, through appropriate communication technologies (power line, radio-frequency, two-wires cable, and so on).

Figure 7:
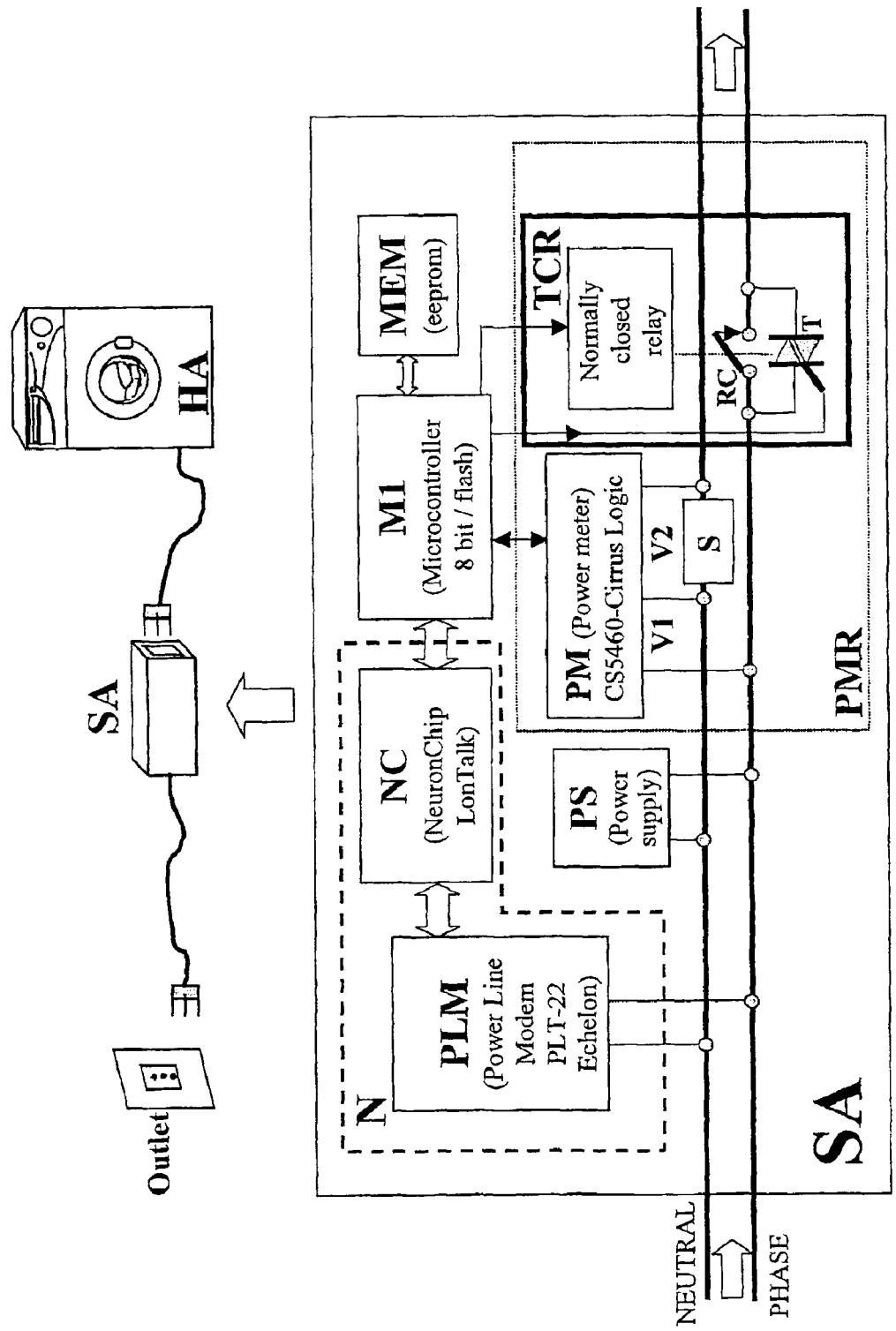
FIG. 7 shows a block diagram of a possible physical embodiment of the monitoring device SA of FIG. 1.

A possible physical implementation of the device SA is represented in FIG. 7 illustrating the block diagram of the device itself and its mode of interconnection with an electric user HA, represented by a laundry washing machine.

The block PLM (Power Line Modem) represented in FIG. 7 is realized, by way of non limiting example, using a transceiver PLT-22 by Echelon (USA), whose purpose is to warrant the bi-directional power line communication towards the external environment through the LonTalk® protocol (ANSI EIA-709). This protocol is implemented within the block indicated with NC realized by a Neuron-Chip® device, currently manufactured by Toshiba and Cypress (LonTalk® and NeuronChip® are registered trademarks of the US company Echelon Inc.).

The set of blocks PLM and NC therefore forms the so-called communication node, represented by the hatched block N in FIG. 7.

The block M1 (Microcontroller) is represented by way of non limiting example by any 8-bit microcontroller (preferably, but not necessarily having a flash memory), whose purpose is to manage the device SA.

The block PS (Power Supply) is the block ensuring the stabilized supply to all the active elements of the device SA, in accordance with their electric specifications.

The block MEM is a memory block consisting, by way of non limiting example, of a non volatile memory of the eeprom type, appropriately connected to the microcontroller M1, wherein the latter stores all information obtained from the study of the trends of one or more electric quantities associated to the operation of the electric user HA, as detected by the metering block PM (Power Meter).

The block PM performs the important task of metering one or more of the various electric quantities associated to the operation of the electric user HA and communicate the metered value to the microcontroller M1, to which it is appropriately connected.

The block PM is realized by way of non limiting example by means of a device CS5460 by Cirrus Logic (USA), capable of metering current, voltage, power factor (cos φ), power and energy.

According to a much simpler and cost-effective version, the block PM may simply consist of a current sensor, such as a resistive shunt or toroid, whose generated voltage, being proportional to the current absorbed by the relevant electric user, is read by the microcontroller M1 (directly or after appropriate amplification) through an appropriate analog-digital conversion channel fitted on it.

It is clear that any other device PM having an intermediate complexity compared to the two limit cases described above, is fully included in the aims of the present invention.

In the instance of the device PM described in FIG. 7, the primary electric quantities represented by the current absorbed by the load HA and the voltage applied to its terminals, are metered through the metering of the voltage V2 detected at the terminals of an appropriate resistive current sensor (resistive shunt or toroid or other current detector), indicated by the block S (Shunt), and voltage V1, as detected through an appropriate resistive divider, not shown since it is contained in the same block PM.

The derived electric quantities, such as cost, power and energy are then obtained through appropriate mathematical elaborations performed by the same device CS5460 of block PM, and made available to the microcontroller M1 for likely further elaborations.

In FIG. 7, TCR indicates a block representing the triac T and the contact RC of a normally closed relay, whose functions have been previously described with reference to FIG. 2.

Figure 8:
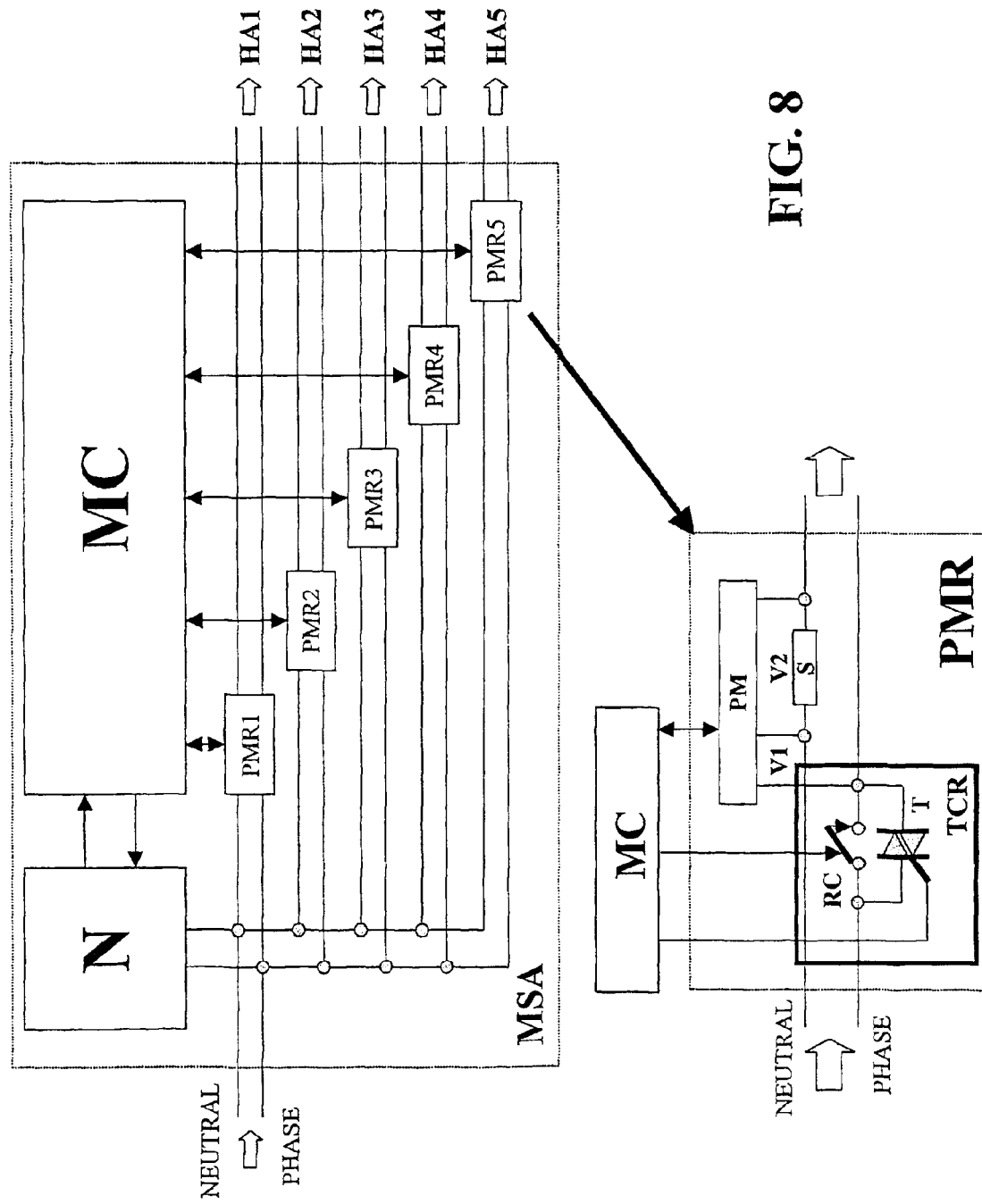
FIG. 8 shows a block diagram of a particular embodiment of a monitoring device capable of dialog with several electric users, according to the invention.

Finally, for a simpler description of the subsequent FIG. 8, the blocks PM, TCR and S of FIG. 7 are contained in a block PMR, which is hatched.

The block PM represents, according to the present invention, the block for receiving the information transmitted by the user HA in the form of controlled absorptions of electric power, as for the technique previously described; the block TCR represents, on the other side, the block for transmitting by the monitoring device SA the information coded-through the network interruptions technique, previously described.

Vice-versa, the control system of the laundry washing machine HA contains two appropriate functional blocks: one for transmitting digital information using the technique based on controlled absorptions of electric power (see the previous description with reference to FIG. 4) and the other for receiving digital information sent by the monitoring device SA using the technique based on network interruptions (see the previous description with reference to FIGS. 3a, 3b and 3c).

It should be noticed that, among the functions listed above, the item "j" (generation of diagnostic information) represents one of the most significant functions of the device SA, being associated to the very important concept of remote assistance and preventive maintenance for the electric user HA.

However, this item is also a most critical one, because it presumes the capacity for the monitoring device SA to detect any failures or malfunctions of the electric user HA in an indirect manner, i.e. only on the basis of the analysis of the values of the power absorptions and/or of other likely electric quantities that can be metered by the meter PM.

Such a criticality might only be solved, according to the known state of art (such as described in U.S. Pat. No. 4,644,320 or EP-A-0 550 263), through a direct dialog between the monitoring device SA and the electric user HA, presuming the latter has an electronic control system and self-diagnose capacity.

However, such a direct dialog cannot be easily obtained with the use of known techniques, since they are too expensive (power line transmission systems) or difficult to practice (direct connection through a specific cable, which involves complexity and costs for the manufacture and installation of the electric users).

Applying, on the contrary, the power modulation transmission techniques covered by the present invention, the problem of a direct dialog between the device SA and user HA can be fully and practically solved without additional costs.

In fact, going back to the application example of FIG. 1, the electric user HA (in this case a laundry washing machine) can send day by day to the device SA according to the present invention all information its electronic system is capable of obtaining or generating; to this purpose, the technique of the modulation/demodulation of the absorbed power based on the controlled absorptions of electric power will be used.

The information may be stored, if necessary, in the memory block MEM of the device SA of FIG. 7: let us think for example of diagnostic information, which can be made available later to the technical people entrusted with the assistance service for the user HA (e.g. by means of a remote data elaboration center, through the block PLM managed according to the LonTalk® communication protocol).

Analogously, the monitoring device SA according to the present invention can send various information to the laundry washing machine HA, such as information relating to the power absorptions of its own electric loads (useful for diagnostic purposes) and other likely information from the external environment (through the power line communication system represented in FIG. 7 with the hatched block N); to this purpose, the technique of modulation/demodulation of the supplied power based on the network interruptions will be used.

By concluding, assuming that the device SA is appropriately located within the cabinet of the laundry washing machine HA, the above application indicates a particularly efficient solution for manufacturing products capable of generating important information (energetic, functional, diagnostic and statistic) and make them available to the external environment through an appropriate communication system.

Finally, it should be pointed out that in agreement with the above description of the device PM of FIG. 7 (which can coincide with the one of FIG. 5), the accurate power measure (derived quantity) performed by the device CS5460 by Cirrus Logic can be replaced with a simple current measure (primary quantity), without departing from the novelty spirit of invention.

In this case, in fact, the concept of "absorbed power" associated to FIGS. 4 and 5 is simply replaced by the concept of "absorbed current", without jeopardizing in any way the present invention.

3.2 Second Example of Use of the Power Modulation Techniques

A second possible application, using advantageously the two data transmission techniques based on power modulation according to the present invention, is described in FIG. 8.

This figure represents the block diagram of a monitoring device, indicated as a whole with MSA (Multiple Smart Adapter), which is obtained as a generalization of the device SA described in the application of FIG. 1 or 7.

The device MSA is in fact derived from the device SA of FIG. 7; as it can be noticed, instead of the single block PMR of FIG. 7 (comprising the block PM, the block TCR and the block S), the device MSA provides for a set of blocks PMR, which in the specific case shown by way of non limiting example in FIG. 8, reach a total of five and are indicated with PMR1–PMR5.

As it can be noticed, the presence of several blocks PMR, managed by the same microcontroller (indicated with MC) through an appropriate bi-directional serial connection, allows for a simultaneous dialog with a corresponding number of electric users, indicated with HA1–HA5.

Since the most expensive part of the device SA is represented by the communication node N, consisting as said above of the power line modem of block PLM and of the Neuronchip of block NC of FIG. 7, a device MSA fitted with "k" blocks PMR (k=5 in the example of FIG. 8) will prove according to the invention far more convenient and easier to use compared to independent "k" devices SA.

Figure 9:
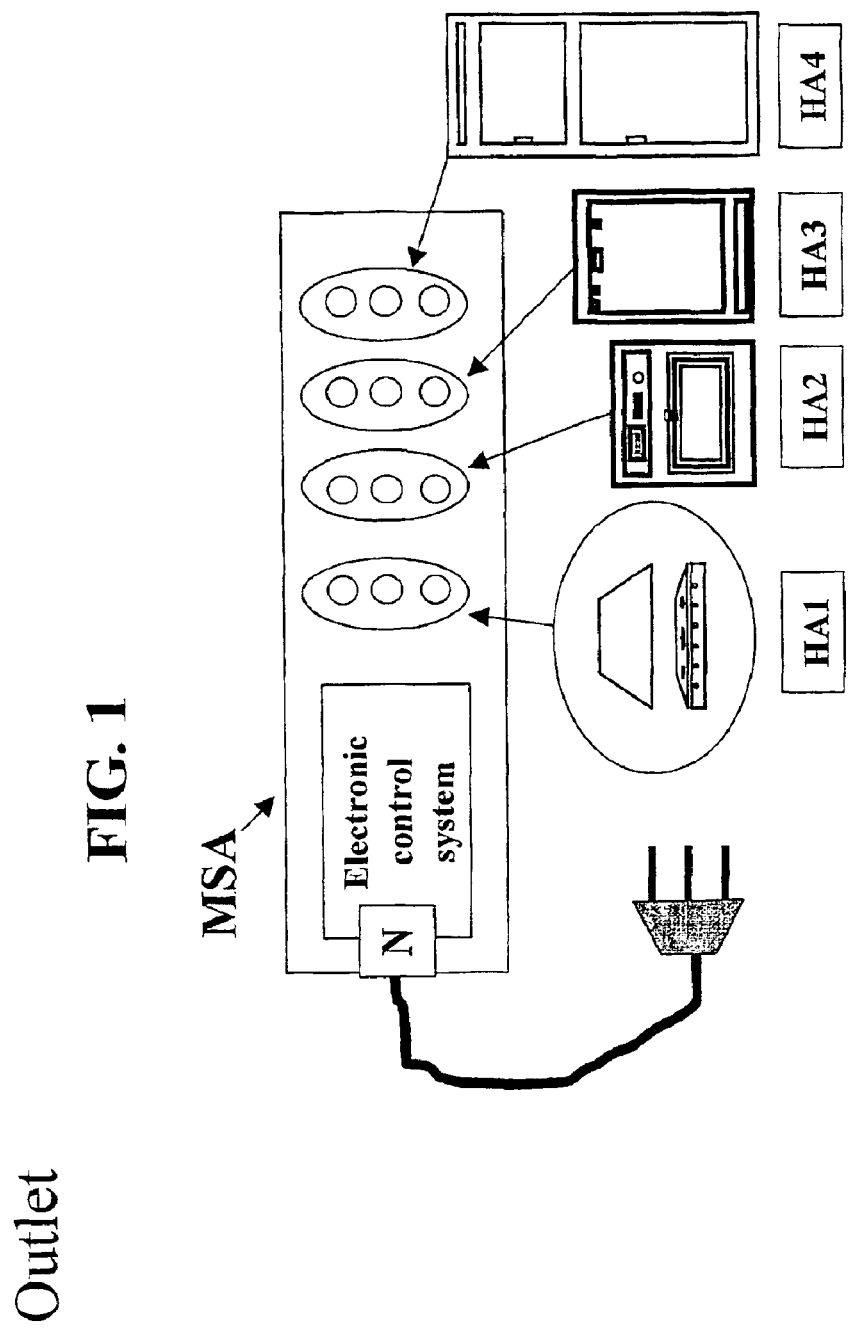
FIG. 9 shows an example of an advantageous use of the monitoring device of FIG. 8.

An example of practical use of a device MSA with four blocks PMR is represented in FIG. 9, where the relevant four electric users HA1–HA4 are represented by a hob with hood, an electric oven, a dishwasher and a refrigerator, respectively.

As it can be imagined, this configuration is particularly advantageous in the field of built-in household appliances, i.e. for kitchen applications where the household appliances are integrated inside the furniture.

Figure 10:
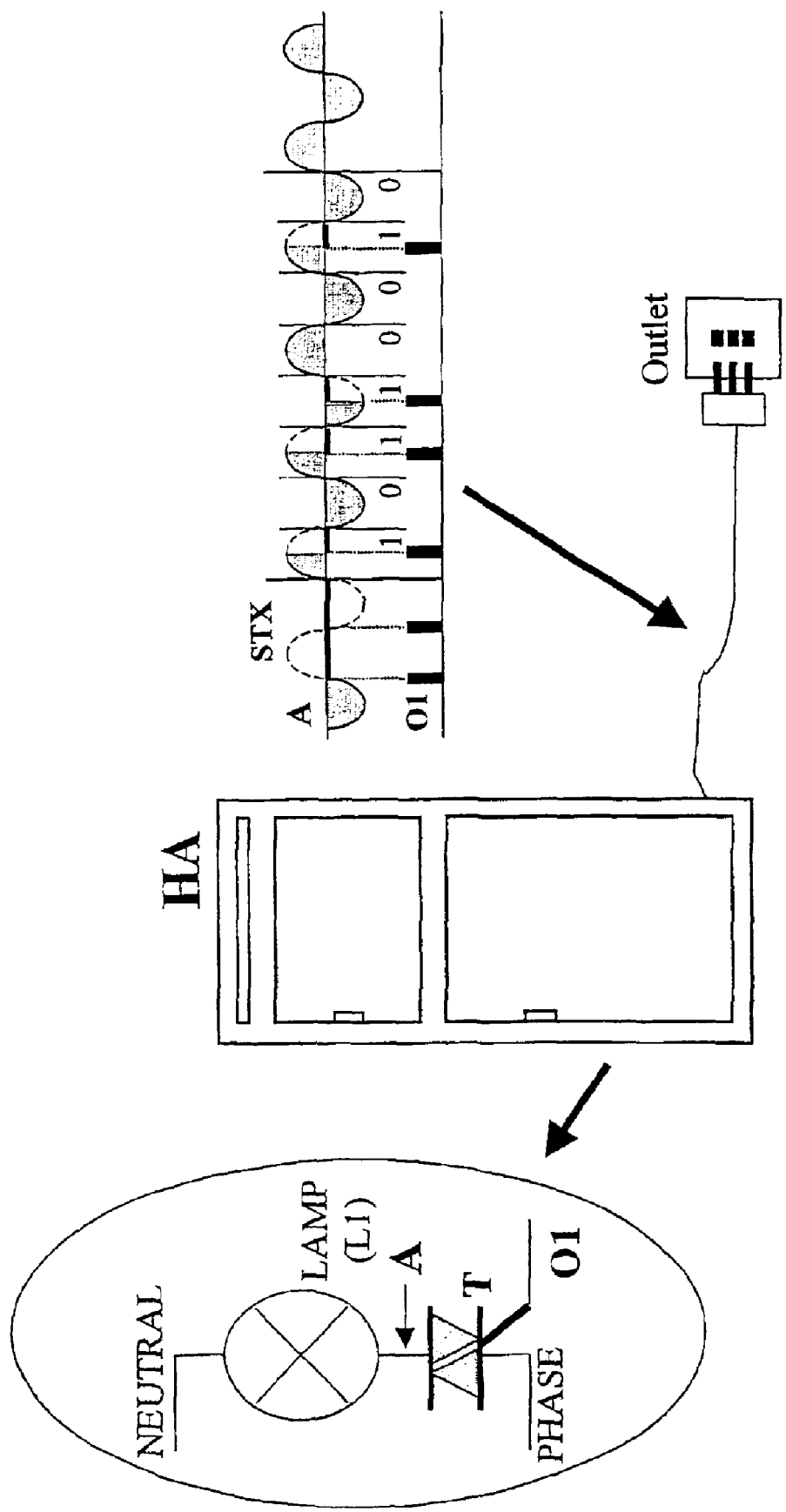
FIG. 10 shows a particularly advantageous use wherein an electric user HA, represented by a refrigerator, uses only the transmission technique based on the modulation/ demodulation of the absorbed power (sink mode) according to the invention, for systematically transmitting information to the external environment, using its own supply cord.

3.3 Example of Use of the Technique Based on Modulation/Demodulation of the Absorbed Power Only A third example of application of the present invention, using advantageously only the data transmission technique based on the controlled absorptions of electric power, is illustrated in FIG. 10, wherein the electric user HA here represented by a household refrigerator, sends information to the external environment through its own supply cord.

The electric load used for the data transmission through the above controlled absorptions of electric power according to the invention consists, by way of non limiting example, of the lamp of the refrigerating compartment, indicated with "LAMP" in the detail of FIG. 10, controlled by means of the triac T, as per the procedures previously described with reference to FIG. 4.

This specific example indicates clearly how the use of the data transmission technique based on controlled absorptions of electric power according to the invention allows for manufacturing, practically without any additional costs, electric users capable of sending information to the external environment without requiring any particular communication node.

Of course, in the example of FIG. 10, an appropriate receiver will be associated to the electric network to which the refrigerator HA is connected with, capable of decoding the modulation of the electric power absorbed by the load represented by the lamp LAMP.

From the above description the features of the present invention are clear.

In particular, a method and a system for transmitting data on electric network have been described, with particular reference to the exchange of binary information between two electric apparatuses, which can be obtained through two different techniques, usable in a single mode or in a combined mode. For instance, the modulation of the supplied power can be well used for sending information to an electric user; the modulation of the absorbed power can be well used for sending information by an electric user.

For both techniques, the binary information are coded through a particular mode of "power modulation".

The first data transmission technique, being identified as "modulation/demodulation of the supplied power" uses appropriate controlled interruptions or lacks of the electric network, defined as "network interruptions" or "voltage interruptions" as coding/decoding means of the binary information.

Vice-versa, the second data transmission technique, being identified as "modulation/demodulation of the absorbed power", uses "controlled absorptions of electric powers" as coding/decoding means of the binary information.

The specific features of the method, the system and the apparatuses according to the present invention are summarized in the annexed claims.

From the above description also the advantages of the present invention are clear; once again it is underlined how the above method, system and relevant apparatuses for data transmission on electric network can be implemented at a very low cost, also on the mass production of household electric users, in particular household electric appliances.

It is clear that many changes are possible for the man skilled in the art to the method, system and devices described above by way of example, without departing from the novelty spirit of the inventive idea.

As previously mentioned, for instance, the transmitter associated to the technique of modulation of the absorbed power can, in general, be based on any electric load of the relevant user, provided is managed by a triac or similar controlled solid state switch.

Therefore, should the load have an excessive power, the control system of the user would be programmed for applying only a minimum portion of the network voltage to such a load.

It is also clear that, should the user control system be capable of detecting a possible malfunction or failure of the transmission stage formed by the system "triac T+electric load L1" (see FIG. 4), the same control system, duly programmed for that purpose, can decide the use of another "triac+electric load" stage for transmitting information to the external environment; this case is shown by way of example in FIG. 4, where L2 and LN indicate in fact further electric loads of the user HA, managed by respective triacs T2 and TN controlled by the microcontroller M2, each one of them perfectly capable of generating controlled power absorptions according to the present invention, in alternative to T1.

As a result, should a malfunction of the "main" transmission stage L1–T1 be detected, the control system of the user HA will be perfectly capable of signaling such a diagnostic problem to the external environment through the technique of the modulation of the absorbed power, using to the purpose one of the "secondary" stages (e.g. L2–T2).

The present invention has been described with a particular reference to its use in the field of household electric users, in particular household electric appliances, but it is clear that its application is possible in any field where a transmission or data communication between two electronically controlled electric apparatuses is useful or required.

What is claimed is:

1. Method for point-to-point communicating, for transmission/reception of data or information over an AC electric power line, between two apparatuses having respective electronic control systems (HA,SA; HA1–HA5,MSA), including:

an electric user (HA; HA1–HA5), in particular a household user, having a first electronic control system (M2) and at least a first electric load (L1; L2,LN);

a monitoring or control device (SA; MSA), having a second electronic control system (M1; MC), said device (SA; MSA) being located on said line between an electric power source (Outlet) and said, user (HA; HA1–HA5);

the transmission/reception of data or information over said line being performed by means of a modulation of electric power between said user (HA; HA1–HA5) and said device (SA; MSA) and/or vice-versa, characterized in that the transmission of data or information over said line from said user (HA; HA1–HA5) to said device (SA; MSA) is performed through a modulation of electric power or current absorbed by said first load (L1; L2,LN) under the control of said first control system (M2), data or information transmitted by said user (HA; HA1–HA5) being encoded through controlled absorptions of electric power or current of said first load (L1; L2,LN), and the reception of data or information (SA; MSA) is performed by said second control system (M1; MC) of said device (SA; MSA) by decoding said controlled absorptions.

2. Method, according to claim 1, characterized by associating respective bits of said data or information with half waves of a mains voltage, where given bits are determined by comparing said controlled absorptions with a predetermined threshold.

3. Method, according to claim 2, characterized in that binary data to be transmitted from said user (HA; HA1–HA5) to said device (SA; MSA) are encoded with a positive logic, where a logic "one" corresponds to said controlled absorption being greater than said predetermined threshold and a logic "zero" corresponds to said controlled absorption being smaller than said predetermined threshold, or with a negative logic, where a logic "zero" corresponds to said controlled absorption being greater than said predetermined threshold and a logic "one" corresponds to said controlled absorption being smaller than said predetermined threshold.

4. Method, according to claim 3, characterized in that the durations of said controlled absorptions are fractions of the mains half period.

5. Method, according to claim 1, characterized in that a sequence of bits forming binary data to be transmitted from said user (HA; HA1–HA5) to said device (SA; MSA) is preceded by a transmission start signal (Start).

6. Method, according to claim 1, characterized by associating several data bits with respective predetermined values of said controlled absorptions.

7. Method, according to claim 6, characterized in that the predetermined values are variable quantities that are associated with half waves of the mains voltage, and the variable quantities are expressed as multiples of a basic absorption (P0).

8. Method, according to claim 7, characterized in that the controlled absorptions correspond to 4-bit binary configurations, or "nibbles".

9. Method, according to claim 1, characterized in that bi-directional exchange of data or information is provided between said device (SA; MSA) and said user (HA; HA1–HA5) over said line and in that the transmission of data or information over said line from said device (SA; MSA) to said user (HA; HA1–HA5) is performed through a modulation of electric power or current supplied to said user (HA; HA1–HA5) under the control of said second control system (M1; MC), data or information transmitted by said device (SA; MSA) being encoded through controlled interruptions of the supply of the electric mains from said device (SA; MSA) to said user (HA; HA1–HA5), and the reception of data or information is performed by said first control system (M2) of said user (HA; HA1–HA5) by decoding said controlled interruptions.

10. Method, according to claim 9, characterized by associating respective bits with half waves of the mains voltage, with predetermined durations being set for controlled interruptions relating to the respective half waves.

11. Method, according to claim 9, characterized in that binary data to be transmitted from said device (SA; MSA) to said user (HA; HA1–HA5) are encoded with a positive logic, where a logic "one" corresponds to the presence of one of said controlled interruptions and a logic "zero" corresponds to its absence, or with a negative logic, where a logic "zero" corresponds to the presence of one of said controlled interruptions and a logic "one" corresponds to its absence.

12. Method, according to claim 11, characterized in that the duration of said controlled interruptions is equal to a fraction of the mains half cycle.

13. Method, according to claim 9, characterized in that a sequence of bits forming binary data to be transmitted from said device (SA; MSA) to said user (HA; HA1–HA5) is preceded by a transmission start signal (Start), represented by one of said controlled interruptions having a duration different from the one being associated to a bit of real data.

14. Method, according to claim 9, characterized by associating several bits with respective predetermined durations of said controlled interruptions that are related to half waves of the mains voltage.

15. Method, according to claim 14, characterized in that said pre-determined durations are expressed as multiples of a basic duration (D0).

16. System for point-to-point communication, for transmission/reception of data or information over an AC electric power line between two apparatuses having a respective electronic control system (HA,SA; HA1–HA5, MSA), including:

an electric user (HA; HA1–HA5), in particular a household user, having a first electronic control system (M2) and at least a first electric load (L1; L2,LN);

a monitoring or control device (SA; MSA), having a second electronic control system (M1; MC), said device (SA; MSA) being located on said line between an electric power source and said user (HA; HA1–HA5);

means being provided for performing the transmission/reception of data or information on said line through a modulation of electric power between said user (HA; HA1–HA5) and said device (SA; MSA), and/or vice-versa, characterized in that said means comprise a transmission stage or transmitter (L1,T1,O1; L2,T2,O2, LN,TN, LN) of said user (HA; HA1–HA5), controlled by said first control system (M2) for performing a modulation of electric power or current absorbed by said first load (L1; L2,LN), said transmitter of said user comprising means (L1,T1,O1; L2,T2,O2,LN,TN,LN) for encoding data or information through controlled absorptions of electric power or current by said first load (L1; L2,LN), and a reception stage or receiver (PM,S,ZD) of said device (SA; MSA), controlled by said second control system (M1; MC) for detecting said modulation of electric power or current absorbed by said first load (L1; L2,LN), said receiver of said device comprising means (PM,S,ZD) for decoding data or information represented by said controlled absorptions.

17. System, according to claim 16, characterized in that said means for encoding comprise a solid state switch or relay, such as a triac (T1; T2,TN), associated to said first load (L1; L2,LN).

18. System, according to claim 17, characterized in that the enabling signal (O1; O2,ON) of said solid state switch or relay (T1; T2,TN) is managed by a microcontroller (M2) and synchronized with a signal (ZD) detecting the mains voltage zero-crossing.

19. System, according to claim 16, characterized in that said means for decoding (PM,S,ZD) comprise an electric power meter (PM).

20. System, according to claim 16, characterized in that said means for decoding (PM,S,ZD) comprise a current detector (S).

21. System, according to claim 16, characterized in that said second control system (M1; MC) comprise means for detecting the presence of power or current absorptions by said first load (L1; L2,LN) and determining their values through a continuous measure of the supplied power or current in respective half waves of the mains voltage.

22. System, according to claim 16, characterized in that said means further comprise
- a transmission stage or transmitter (T,RC,G,ZD) of said device (SA; MSA), controlled by said second control system (M1; MC) for performing a modulation of electric power or current supplied by said device (SA; MSA) to said user (HA; HA1–HA5), said transmitter of said device (SA; MSA) comprising means (T,RC,G, ZD) for encoding data or information through controlled interruptions of the supply of the electric mains from said device (SA; MSA) to said user (HA; HA1–HA5), and
- a reception stage or receiver (D1,D2,R1–R3,TR1,SD; RB,R1–R3,TR1,SD; RB,R1,R2,SD; DZ1,C1,R1'–R3', D1'D2') of said user (HA; HA1–HA5), controlled by said first control system (M2) for decoding said modulation of electric power or current supplied by said device (SA; MSA), said receiver of said user comprising means (D1,D2,R1–R3,TR1,SD; RB,R1–R3,TR1, SD; RB,R1,R2,SD; DZ1,C1,R1'–R3',D1'D2') for decoding the data or information represented by said controlled interruptions.

23. System, according to claim 22, characterized in that said means for encoding (T,RC,G,ZD) of the transmitter (T,RC,G,ZD) of said device (SA; MSA) comprise a solid state switch or relay, in particular a triac (T), whose enabling signal (G) is synchronized with a signal (ZD) detecting the mains voltage zero-crossing.

24. System, according to claim 23, characterized in that said solid state switch or relay (T) is in parallel to the normally closed contact (RC) of an electromechanical relay.

25. System, according to claim 22, characterized in that said means for decoding (D1,D2,R1–R3,TR1,SD; RB,R1–R3,TR1,SD; RB,R1,R2,SD; DZ1,C1,R1'–R3', D1'D2') of the receiver (PM,S,ZD) of said device (SA; MSA) comprise two diodes (D1,D2), whose anodes are located in particular at the terminals of the secondary of a transformer (TF) of said first control system (M2).

26. System, according to claim 25, characterized in that the half waves exiting the secondary of said transformer (TF), rectified by said diodes (D1,D2), are applied to the base of a transistor (TR1) through a resistive divider (R1, R2), for generating a pulse applied to a digital signal input (SD) of a microcontroller (M2).

27. System, according to claim 22, characterized in that said means for decoding (D1,D2,R1–R3,TR1,SD; RB,R1–R3,TR1,SD; RB,R1,R2,SD; DZ1,C1,R1'–R3', D1'D2') of the receiver (PM,S,ZD) of said device (SA; MSA) comprise a diodes bridge (RB) for rectifying the half waves exiting a transformer (TF) of said first control system (M2), and apply them to the base of a transistor (TR1) through a resistive divider (R1,R2), for generating a pulse being directed to a digital signal input (SD) of a microcontroller (M2).

28. System, according to claim 22, characterized in that said means for decoding (D1,D2,R1–R3,TR1,SD; RB,R1–R3,TR1,SD; RB,R1,R2,SD; DZ1,C1,R1'–R3', D1'D2') of the receiver (PM,S,ZD) of said device (SA; MSA) comprise a diodes bridge (RB) for rectifying the output voltage of the secondary of a transformer (TF) of said first control system (M2) and generate through a resistive divider (R1,R2) a signal applied to an analog signal input (SD) of a microcontroller (M2).

29. Method, according to claim 15, characterized in that a 4-bit binary configuration, or "nibble" is associated to each half wave of the mains voltage.

30. System, according to claim 24, characterized in that said electromechanical relay (RC), solid state switch or relay (T) and said synchronism signal (ZD) are managed by a microcontroller (M1; MC) being part of said second control system (M1; MC).

31. A monitoring or control device comprising:
- measuring means (PM, S) for measuring at least one of electric current and power absorbed instant by instant by an electric user (HA; HA1–HA5), to determine modulation of electric power by said user,
- modulation means (T, RC, G, ZD) for implementing a modulation of the electric power supplied to said user (HA; HA1–HA5), to communicate data to said user,
- decoding means (PM, S, ZD) connected to receive measurements from said measuring means, for decoding the modulation to determine data received from said user (HA; HA1–HA5); and
- connecting means (N) for connecting to a network, for communication with the outside using a protocol and communication media, said connecting means providing data communicated from the outside to said modulation means for communication to said user.

32. A monitoring or control device, according to claim 31, characterized in that power line is used as media for said communication with the outside.

33. A monitoring or control device, according to claim 31, characterized in that radio-frequency is used as media for said communication with the outside.

34. A monitoring or control device, according to claim 31, characterized in that two-wires cable is used as media for said communication with the outside.

35. A monitoring or control device, according to claim 31, characterized in that data or information received from said user (HA; HA1–HA5) are transmitted onto the network through said connecting means (N).

36. A monitoring or control device, according to claim 31, characterized in that the device further includes a means (N,RC) for remote controlling of said user (HA; HA1–HA5).

37. A monitoring or control device, according to claim 36, characterized in that data or information for said remote controlling of said user (HA; HA1–HA5) are provided by the network through said connecting means (N).

* * * * *